United States Patent [19]

Ichinose et al.

[11] 4,269,321
[45] May 26, 1981

[54] PEELABLE BONDED STRUCTURES AND PROCESS FOR PREPARING SAME

[75] Inventors: Isao Ichinose, Hiratsuka; Fumio Mori, Yokohama; Noboru Suzuki, Chigasaki, all of Japan

[73] Assignee: Toyo Seikan Kaisha, Ltd., Tokyo, Japan

[21] Appl. No.: 964,188

[22] Filed: Nov. 28, 1978

[30] Foreign Application Priority Data

Nov. 29, 1977 [JP] Japan .................. 52-142219

[51] Int. Cl.³ .................. B65D 41/12; B32B 15/08
[52] U.S. Cl. .................. 215/343; 40/311; 215/230; 215/341; 215/328; 215/347; 260/DIG. 37; 428/202; 428/204; 428/209; 428/413; 428/416; 428/418; 428/461; 428/463; 428/501; 428/506; 428/515; 428/516; 428/520; 428/522
[58] Field of Search .............. 260/DIG. 37; 428/416, 428/461, 204, 209, 202, 413, 516, 418, 515, 501, 506, 463, 520, 522; 215/230, 328, 347, 341, DIG. 2, DIG. 4, 343; 40/311, 307

[56] References Cited

U.S. PATENT DOCUMENTS

| | | | |
|---|---|---|---|
| 3,233,770 | 2/1966 | Waters | 215/230 |
| 3,361,281 | 1/1968 | Kehe | 215/228 |
| 3,487,124 | 12/1969 | Yeshin | 428/461 |
| 3,581,690 | 6/1971 | Zapata | 113/121 A |
| 3,633,781 | 1/1972 | Zapata | 215/230 |
| 4,012,270 | 3/1977 | Fitko | 428/416 |
| 4,034,132 | 7/1977 | Manuel | 428/416 |
| 4,062,997 | 12/1977 | Hotta | 428/416 |

*Primary Examiner*—Ellis P. Robinson
*Attorney, Agent, or Firm*—Pennie & Edmonds

[57] ABSTRACT

A peelable bonded structure having a peel strength of 0.05 to 5 kg/cm comprises a plurality of articles, at least one of which is made of metal, bonded together through a composite coating layer. The composite coating layer is composed of adjacent first and second coating layers at least one of which comprises (A) a modified olefin resin having a carbonyl group concentration of 0.01 to 200 milliequivalents per 100 g of the olefin resin and (B) a coating film-forming base resin at an (A)/(B) weight ratio of from 0.2/99.8 to 40/60 and has a multi-layer distribution structure having resin concentration gradients in the thickness direction such that the modified olefin resin (A) is distributed predominantly in the portion contiguous to the interface between the two coating layers and the base resin (B) is distributed predominantly in the opposite portion.

13 Claims, 10 Drawing Figures

PEELABLE BONDED STRUCTURES AND PROCESS FOR PREPARING SAME

BACKGROUND OF THE INVENTION

This invention relates to bonded structures and processes for preparing them. More particularly, it relates to a peelable bonded structure comprising a plurality of articles bonded through a coating. At least one of the articles is a metal article and the coating has a composite structure which facilitates peeling of the articles from one another when desired.

Bonded structures comprising a plurality of articles which are bonded together to such an extent that they can be peeled apart are often required in various fields, especially in the packaging of materials in vessels.

Sealing materials such as crown closures and other vessel closures, have heretofore been prepared by coating a surface-protecting paint onto a metal sheet, forming the coated metal sheet into a crown shell, cap shell or the like and bonding a packing material to the inner face of the formed article. In premium sales of bottled beverages and the like, systems have been adopted in which a prize or premium is given for a predetermined number of packings or a packing having a winning mark. In the production of crown closures or caps for use in such premium sales, it is essential that packings be readily peelable from crown shells or cap shells when desired. However, it is also necessary that packings be bonded to crown shells or cap shells to such an extent that separation does not occur during the preparation of such crown closures or caps, during their transportation, or during the step of sealing the bottles. Also, crown or cap shells should have adequate corrosion resistance to the contents of the vessel and they should be able to withstand such processing as crimping or roll-on. Also, from the sanitary viewpoint, it is not permissable to print the surface of a packing which directly contacts a beverage. In general, a packing per se is applied to the inner face of a crown shell or cap in the state where it has a certain flowability. Accordingly, it is desirable that when a packing is peeled off, a printing ink layer formed on the inner face of a crown shell or cap is transferred in the state adhering to the packing.

These special peeling characteristics are also required for cans having so-called "easy-open"-type mechanisms. For example, a can vessel having an easy-open end, which is prepared by forming one or more openings necessary for drinking through a can end-member composed of a surface-protecting coating-applied metal sheet and bonding a peel piece composed of an organic resin-coated metal foil or sheet over said opening or openings is known in the art. Also, in such easy-open end structures, excellent adhesion and sealing are required between the can end member and peel piece during storage, but when the can vessel is opened, the peel piece should be separable from the can end member without risk of breaking the peel piece.

In order to form a bonded structure of two articles which can be peeled from each other in the bonded area without breakage of the articles, it is necessary that the peel strength of the bonded region should be within a certain range, generally about 0.05 to 5 kg/cm. If the peel strength is lower than 0.05 kg/cm, peeling is undesirably found to occur before the articles are intentionally peeled. On the other hand, when the peel strength is greater than 5 kg/cm, it is generally difficult or impossible to effect peeling at the bonded interface without breaking the bonded articles.

Furthermore, in order to easily peel two bonded articles from each other at their bonded interface, it is necessary that peeling be facilitated in that portion of the bonded interface where peeling is initiated.

Accordingly, it is an object of the present invention to provide novel peelably bonded structures comprising a plurality of articles, in which at least one of the articles is composed of metal and which articles can be peeled apart when desired.

Another object of the invention is to provide a peelably bonded structure in which a plurality of articles are bonded together to such an extent that the bonded structure as a whole has a peel strength of between about 0.05 and 5 kg/cm or so that peeling can easily occur between the bonded articles in the peeling-initiating region.

Another object of the invention is to provide a vessel closure comprising a metal substrate of a vessel closure such as a crown shell or cap shell and a packing material peelably bonded to the metal substrate through a plurality of coating layers.

Another object of the invention is to provide an easy-open vessel comprising a can end member having an opening and a peel piece peelably bonded to the can end member through a plurality of coating layers.

Yet another object of the invention is to provide a process for producing the aforementioned peelably bonded structures.

These and other objects of the invention as well as a fuller understanding of the advantages thereof can be had by reference to the following detailed description, drawings and claims.

SUMMARY OF THE INVENTION

The foregoing objects are achieved according to the present invention by the discovery of a peelable bonded structure comprising a plurality of articles bonded through a coating layer, at least one of said articles being composed of a metal, and wherein said coating layer is a composite coating layer having adjacent first and second coating layers. At least one of said first and second coating layers comprises (A) a modified olefin resin having a carbonyl group concentration of between about 0.01 and 200 milliequivalents per 100 g of the resin and (B) a coating film-forming base resin at an (A)/(B) weight ratio of between about 0.2/99.8 and 40/60 and has a multi-layered distribution structure having concentration gradients in the thickness direction with resulting distribution ratios such that the modified olefin resin (A) is distributed predominantly in the portion or sub-layer contiguous to the interface between the first and second coating layers and the base resin (B) is distributed predominantly in the opposite portion or sub-layer, and the bonded articles have a peel strength of about 0.05 to 5 kg/cm between the first coating layer and the second coating layer.

The distribution ratio, Dx, is defined by the following formula:

$$D_x = 10000\, W_X/(W)(C_A)$$

wherein W is the weight of the first coating layer per unit surface area (mg/dm$^2$), $C_A$ is the average % by weight of the modified olefin resin in the first coating layer, and $W_X$ is the weight per unit area (mg/dm$^2$) of the modified olefin resin in each sub-layer.

In accordance with another aspect of the invention, there is provided a process for preparing peelable bonded structures comprising applying to a metal substrate a paint composition comprising the aforementioned modified olefin resin and coating film-forming base resin in a solvent system containing at least 70% by weight of a solvent component having a solubility parameter of from about 8.5 to 9.5 and wherein (in the case of mixed solvents) the difference in atmospheric boiling points between the highest and lowest boiling solvent components is at least about 20° C., and curing the applied paint to form a first coating layer, whereby a multi-layer distribution structure is formed therein such that the modified olefin resin is distributed predominantly in the surface area portion of the layer, applying another paint composition onto the first coating layer to form a second coating layer, and heat bonding a second article to the second coating layer or heat-bonding a second article having the second coating layer pre-formed thereon to the first coating layer having the multi-layer distribution structure formed therein.

Metals and alloys such as iron, steel, copper, aluminum, zinc, stainless steel, bronze, cupronickel, duralmin and die casting alloys can be used as the metal substrate in the present invention. Further, the metal substrate can be composed of steel plated with zinc, tin, chrominum or the like, or steel treated with phosphoric acid or chromic acid or electrolytically treated with chromic acid. The shape of the metal substrate is not critical. For example, the metal substrate can be in the form of a metal foil, rolled thin plate, panel, sheet, rod, beam, other formed material, wire, twisted wire, crown shell, cap, other vessel, a construction material or vehicle construction. The present invention is preferably applied to an untreated steel plate (so-called black plate), a steel plate whose surface has been treated with phosphoric acid or chromic acid or electrolytically treated with chromic acid, or a steel plate whose surface has been electrolytically plated or fusion-plated with tin, zinc or the like. When the present invention is applied to these metal substrates, their bondability to a second article can be effectively enhanced while remarkably improving the corrosion resistance of the substrates per se. In order to further enhance the anti-corrosive effect, the surface of the metal substrate can be coated in advance with any known primer such as an epoxy-amino resin, a phenol-epoxy resin, an epoxy-urea resin, a phenol-epoxy-vinyl resin, an epoxy-vinyl resin or the like.

An important feature of the present invention is that when a combination of a specific modified olefin resin and a coating film-forming base resin is used, a multi-layer distribution structure is obtained having concentration gradients of the two components in the thickness direction such that the base resin is distributed predominently in the portion of the first coating layer contiguous to the metal substrate and the modified olefin resin is distributed predominantly in the portion contiguous to the second coating layer.

In another feature of the present invention, the olefin resin or polymer is modified with carbonyl groups (—CO—) at a concentration of about 0.01 to 200 milliequivalents per 100 g of the polymer, preferably about 0.1 to 70 milliequivalents per 100 g of the polymer and has a degree of crystallinity of at least about 50% and preferably at least about 70%, in order to achieve the aforementioned multi-layer distribution structure in the first coating layer (hereinafter referred to also as the "primer layer") and to improve the mechanical bonding strength between the first and second coating layers, such bonding strength being resistant to moisture or hot water and permitting the processability of the bonded area.

The degree of crystallinity in the modified olefin resin significantly influences the formation in the primer layer of the aforementioned multi-layer distribution structure having specific concentration gradients in the thickness direction. The degree of crystallinity referred to herein is determined by the X-ray diffraction method described by S. L. Aggarwal and G. D. Tilley in the Journal of Polymer Science, 18, pp. 17–26 (1955). When the degree of crystallization of the modified olefin resin is lower than about 50% it is possible to disperse the resin into the coating film-forming base resin but it is very difficult to distribute the modified olefin resin predominantly in the top face portion of the primer layer, i.e., in the portion contiguous to the second coating layer.

The concentration of carbonyl groups in the modified olefin resin significantly influences the compatibility or affinity of such resin with the coating film-forming base resin and the second coating layer as well as the formation in the primer layer of the multi-layer distribution structure having the prescribed concentration gradients in the thickness direction. When the carbonyl group concentration in the modified olefin resin is below the above-mentioned range, the compatability of such resin with the base resin and the second coating layer is lowered and, as a result, even if the modified olefin resin is distributed predominantly in the top face portion of the primer layer, no satisfactory bonding strength (i.e., at least about 0.05 kg/cm) can be achieved between the second coating layer and the primer layer. If the carbonyl group concentration in the modified olefin resin exceeds the above-mentioned range, the result is often excessive affinity of such resin with the base resin and second coating layer and the peel strength becomes too high (i.e., greater than about 5 kg/cm) and a peelable structure is difficult to obtain. Also, because of excessive compatability or affinity of the modified olefin resin with the base resin, it is difficult to form a multi-layer distribution structure in which the modified olefin resin is distributed predominantly in the top face portion of the primer layer.

In contrast, when a modified olefin resin or polymer having a degree of crystallinity of at least 50% and containing carbonyl groups at a concentration of 0.01 to 200 milliequivalents per 100 g of polymer is used as the modified olefin resin according to the present invention, a multi-layer distribution structure is achieved in the primer layer in which the modified olefin resin is distributed predominantly in the upper portion and the base resin is distributed predominantly in the lower portion, and the second article is bonded to the metal substrate with peelable bonding strength through the specific modified olefin resin-base resin distribution structure in the primer layer. Furthermore, although incorporation of a modified olefin resin into the primer layer normally tends to reduce the corrosion resistance of the metal substrate, if the above-mentioned multi-layer distribution is manifested in the primer layer according to the present invention, it is possible to impart to the metal substrate a high corrosion resistance comparable to that attainable by a primer layer free of a modified olefin resin.

In the present invention, any of the products formed by incorporating carbonyl group-containing ethylenically unsaturated monomers into main or side chains of olefin resins by known treatments such as graft copolymerization, block copolymerization, random polymerization and terminal treatment can be used as the modified olefin resin in the present invention, consistent with the foregoing requirements.

As the carbonyl group-containing ethylenically unsaturated monomer, there can be used monomers having a carbonyl group (—CO—) derived from a carboxylic acid, a carboxylic acid salt, a carboxylic anhydride, a carboxylic acid ester, a carboxylic acid amide or imide, an aldehyde or a ketone; monomers having a cyano group (—CN); monomers having a hydroxyl group; monomers having an ether group and monomers featuring an oxirane ring

(—C—O—C—).

These carbonyl group-containing monomers can be used singly or in the form of a mixture of two or more of them. Examples of monomers suitable for use in the invention include ethylenically unsaturated carboxylic acids such as acrylic acid, methacrylic acid, maleic acid, fumaric acid, crotonic acid, itaconic acid, citraconic acid and 5-norbornene-2,3-dicarboxylic acid; ethylenically unsaturated carboxylic anhydrides such as maleic anhydride, citraconic anhydride, 5-norborne-2,3-dicarboxylic anhydride and tetrahydrophthalic anhydride; ethylenically unsaturated esters such as ethyl acrylate, methyl methacrylate, 2-ethylhexyl acrylate, monoethyl maleate, diethyl maleate, vinyl acetate and vinyl propionate, gamma-hydroxypropylmethacrylate, beta-hydroxyethylacrylate and glycidyl methacrylate; ethylenically unsaturated amides and imides such as acrylamide, methacrylamide and maleimide; ethylenically unsatured aldehydes and ketones such as acrolein, methacrolein, methylvinyl ketone and butylvinyl ketone.

Among the foregoing monomers, ethylenically unsaturated carboxylic acids and ethylenically unsaturated carboxylic anhydrides are especially preferred for use in the present invention. These monomers can be used singly or in combination with other monomers for modification of the olefin resin.

Examples of olefin resins suitable for use in the present invention include polymers of ethylene, propylene, butene-1, pentene-1 and 4-methylpentene-1. These olefins can be used singly or in the form of a mixture of two or more of them.

In order to modify an olefin resin so that the foregoing requirements are satisfied, for example, in case of a grafting treatment, it is necessary to select an olefin resin having a degree of crystallinity of at least 50% as the starting resin and to conduct the grafting treatment under conditions such that the degree of crystallinity of the resin is not reduced below 50%. For this reason, high density polyethylene or isotactic polypropylene or a highly crystalline ethylene-propylene copolymer is preferably employed as the trunk polymer. Further, under such mild grafting conditions as will not cause any substantial reduction of the degree of crystallinity, medium and low density polyethylenes having a degree of crystallinity higher than 50% can also be used. In carrying out the grafting treatment, for example, when a trunk polymer composed of an olefin resin is contacted with a carbonyl group-containing ethylenically unsaturated monomer in the presence of a radical initiator or under free radical initiating conditions, a modified olefin resin is readily obtained. The trunk polymer can be contacted with the monomer in a homogenous solution system, a heterogenous solid-liquid or solid-gas system or a homogenous melt system. As the free radical initiators, one can use, for example, organic peroxides such as dicumyl peroxide, t-butyl hydroperoxide, dibenzoyl peroxide and dilauroyl peroxide and azonitriles such as azobisisobutyronitrile and azobisisopropionitrile. These initiators can be used in conventional catalytic amounts. Suitable free radical initiating means include for example, ionizing radiation such as X-rays, gamma-rays and electron beams; ultraviolet radiation, combinations of ultraviolet rays with sensitizers, and mechanical radical initiating means such as kneading (mastication) and ultrasonic vibration.

In the case of reaction in a homogenous system, the olefin resin, monomer and initiator are dissolved in an aromatic solvent such as toluene, xylene or tetralin wherein the grafting reaction is carried out. The resulting modified olefin resin is recovered as a precipitate. In the case of reaction in a heterogenous system, a powder of the olefin resin is contacted with the monomer or a dilute solution of the monomer under ionizing radiation to effect grafting. In the case of reaction in a homogenous melt system, a blend of the olefin resin and monomer, optionally together with an initiator, is melt-extruded by an extruder or kneader to form a modified olefin resin. In each case, the resulting modified olefin resin can be subjected to a purifying treatment such as washing or extraction to remove the unreacted monomer, homopolymer, or the residual initiator. Further, when the resulting modified olefin resin is crystallized from an aromatic solvent such as mentioned above and the crystallization conditions are appropriately controlled, the particle size can be adjusted.

Another type of modified olefin resin having the above-mentioned carbonyl group concentration is oxidized polyethylene prepared by oxidizing polyethylene or a copolymer composed mainly of ethylene in the molten or solution state.

From the viewpoints of the compatibility with the base resin and ease of formation of the aforementioned multi-layer distribution structure it is preferred that the density (g/cc) of the oxidized polyethylene be about 0.90 to 1.2, and preferably about 0.95 to 1.0, with the preferred density depending on the degree of crystallinity and carbonyl group concentration. From the standpoint of the processability of the coated article and the strength of the coating per se, it is preferred that the average molecular weight of the oxidized polyethylene be about 1,000 to 50,000, and preferably about 4,000 to 10,000.

Any of the known base resins heretofore used to form anti-corrosive coating layers can be employed as the coating film-forming base resin in the present invention. In general, in order to achieve the aforementioned multi-layer distribution structure in the primer layer and increase the bondability of such layer to the metal substrate, it is preferred to use a coating film-forming base resin or polymer having a density greater by at least about 0.1 than the density of the modified olefin resin, generally a density of about 1.2 to 1.3, and containing hydroxyl functional groups and/or carbonyl functional groups at a concentration of at least about 1 milliequivalent per gram of the polymer, and preferably about 3 to 20 milliequivalents per gram of the polymer.

When a base resin having a density higher by at least 0.1 than the density of the modified olefin resin is used, it becomes much easier to obtain the specific multi-layer distribution structure of the present invention in the primer layer. Further, if the concentration of hydroxyl or carbonyl functional groups in the base resin or polymer is at least 1 milliequivalent per gram of the polymer, the adhesion of the primer layer to the metal substrate and the corrosion resistance of the latter can be further improved.

In the base resin used to form the primer layer, hydroxyl groups can be included in the main or side chain of the polymer in the form of alcoholic hydroxyl groups, phenolic hydroxyl groups or mixtures thereof, and carbonyl groups can be introduced into the main or side chain of the polymer in the form of a carboxylic acid, carboxylic acid salt, carboxylic acid ester, carboxylic acid amide, ketone, imide, urea or urethane.

Base resins meeting the foregoing requirements include thermosetting and thermoplastic resin vehicles customarily used in paint formulations. For example, one can use thermosetting resins such as phenol-formaldehyde resins, urea-formaldehyde resins, melamine-formaldehyde resins, xylene-formaldehyde resins, epoxy resins, alkyd resins, polyester resins, thermosetting acrylic resins, urethane resins and mixtures thereof, and thermoplastic resins such as acrylic resins, vinyl chloride-vinyl acetate copolymers, vinyl chloride-vinyl acetate-maleic acid copolymers, vinyl butyral resins, other vinyl resins, styrene-butadiene-acrylic acid ester copolymers, polyamide resins and petroleum resins, consistent with the foregoing requirements.

The so-called thermosetting resins are preferably employed as base resins for formulation of primers in the present invention, and among them, phenolic resin-epoxy resin paints, urea resin-epoxy resin paints, melamine resin-epoxy resin paints and phenolic resin-vinyl resin paints are especially preferred.

In forming a coating composition for preparing the primer layer, the modified olefin resin (A) is combined with the coating film-forming base resin (B) at an (A)/(B) weight ratio of from about 0.2/99.8 to 40/60. Since in the primer layer the base resin is distributed predominantly in the portion or sub-layer contiguous to the metal substrate and the modified olefin resin is distributed predominantly in the portion or sub-layer contiguous to the second coating layer, even if the content of the modified olefin resin is as low as 0.2% by weight, a bond can be obtained between the primer layer and the second coating layer, and even if the content of the base resin is as low as 60% by weight, the adhesion between the primer layer and the metal substrate will be enhanced.

The amount of primer layer coated on the metal substrate, i.e., the weight of non-volatile resin solids per unit surface area of the metal substrate, is desirably about 10 to 500 mg/dm$^2$, and preferably about 30 to 100 mg/dm$^2$. If the amount of primer layer coated is within this range, a good combination of a high corrosion resistance and a high adhesion can be attained. The amount of modified olefin resin coated is desirably about 0.01 to 100 mg/dm$^2$, and preferably about 0.1 to 10 mg/dm$^2$, and the amount of base resin coated is desirably about 1 to 500 mg/dm$^2$, and preferably about 10 to 100 mg/dm$^2$.

In carrying out the primer layer coating step, a liquid coating composition comprising the modified olefin resin and base resin at the above-mentioned weight ratio in a mixed solvent described hereinafter is prepared and applied to the surface of the metal substrate to be bonded to the second article, after which the mixed solvent is evaporated to obtain the above-mentioned novel multi-layer distribution structure in the primer layer.

In order to effectively obtain the multi-layer distribution structure in the primer layer, it is important that the mixed solvent contain at least 70% by weight of a solvent component having a solubility parameter (Sp value) of about 8.5 to 9.5 and the difference between the atmospheric boiling point of the solvent component ($S_1$) having the highest boiling point and the boiling point of the solvent component ($S_2$) having the lowest boiling point should be at least about 20° C., preferably at least about 25° C.

When a solvent having a solubility parameter (Sp value) within the above range is used in an amount of at least about 70% by weight based on the total mixed solvent, the base resin can be completely dissolved in the mixed solvent and the modified olefin resin is dispersed or suspended in the form of fine particles having a so-called emulsion particle size of between about 2 and 50 microns, and preferably between about 5 to 20 microns. If the paint thus prepared is coated and baked or cured, the above-mentioned multi-layer distribution structure can be obtained in stable form. When a solvent having a solubility parameter (Sp value) in the above range is not contained in the mixed solvent or its content is lower than 70% by weight, it is generally difficult to form a paint having the above-mentioned dispersion state and which is capable of forming a multi-layer distribution structure.

When a single solvent is used or when the maximum difference in boiling points is less than 20° C. in the case where a plurality of solvents are used, it is difficult to form a primer layer having the abovementioned multilayer distribution structure, and the processability of the primer-coated metal substrate or the bonded structure is unsatisfactory. In contrast, when the modified olefin resin and the base resin are dissolved in an appropriate mixed solvent and the resulting paint is coated on the substrate and cured, as will be apparent from examples hereinbelow, there is formed in the primer layer a structure in which the modified olefin resin is distributed predominantly in the surface portion of the coating. The reason is not completely understood, but it is believed that under conditions of drying or baking the coated paint, the temperature of the coating composition varies with a certain gradient while the solvents are evaporated and this temperature variation promotes the formation of the desired multi-layer distribution structure.

The solvent ($S_1$) having the highest boiling point is used in an amount of between about 10 and 70% by weight, and preferably between about 20% to 60%, based on the total solvents, and the solvent ($S_2$) having the lowest boiling point is used in an amount of between about 10 and 70% by weight, and preferably about 20 to 60%. Suitable solvents include ketones such as acetone, methylethyl ketone (MEK), methylisobutyl ketone (MIBK), cyclohexanone and isophorone; alcohols such as diacetone alcohol, n-butanol, methylcellosolve and butylcellosolve; and aromatic hydrocarbons such as toluene, xylene and decalin. Examples of suitable combinations of solvents are methylisobutyl ketone/methylethyl ketone, methylisobutyl ketone/diacetone alcohol/xylene, and n-butanol/xylene/cyclohexanone/isophorone.

A coating composition for forming the primer layer can be prepared by dissolving the base resin in one or more of the foregoing organic solvents and adding the modified olefin resin in the form of a solution in, for example, hot xylene or decalin to the base resin solution to form a homogeneous composition. In general, the resin concentration in the thus-formed liquid coating composition is preferably between about 10 and 50% by weight.

Before applying a primer layer to the surface of the metal substrate, the latter can, if desired, be degreased and washed according to well-known procedures, whereupon the above-mentioned liquid coating composition is applied to the surface of the metal substrate by conventional coating means such as dip coating, spray coating, roller coater coating, bar coater coating, electro-deposition coating, and electrostatic coating.

The liquid coating composition applied to the metal substrate is then cured by drying or baking. In general, the baking step should be carried out at a temperature higher than the melting point of the modified olefin resin, preferably about 150° to 200° C. In this way, the base resin is distributed predominantly in the portion of the primer layer contiguous to the metal substrate and the modified olefin resin is distributed in the surface portion of the primer layer to form the multi-layer distribution structure. Although the reason for this phenomenon has not been completely elucidated, it is believed that in the combination of the modified olefin resin and base resin having the above-mentioned specific properties, under drying conditions a tendency to cause phase separation between the two resins is brought about and the modified olefin resin, having a lower specific gravity, is caused to rise in the surface portion of the primer coating, and this tendency to cause phase separation is promoted by evaporation of the solvents. In the case where the base resin is a thermosetting resin, curing of the base resin is caused by the heat treatment, and it is believed that formation of the multi-layer distribution structure is promoted also by curing of such resin.

Any heating device can be used for this heat treatment as long as the temperature used is within the above-mentioned range. For example, heating furnaces customarily used for the baking of coatings, such as a hot air furnace, infrared heating furnace, high frequency induction heating furnace and the like, can be used in the present invention.

From the standpoints of operating efficiency and productivity, the modified olefin resin and base resin constituting the primer layer are preferably applied in the form of a liquid coating composition comprising both resins. A primer layer having the above-mentioned multi-layer distribution structure can also be formed by coating a solution of the base resin (B) alone onto the cleaned surface of the metal substrate, and then coating a solution or fine dispersion of the modified olefin resin onto the coating of the base resin. The resulting dual coating is heated at a temperature higher than the melting point of the modified olefin resin. In this case, in order to dissolve both resins in each other at the interface between the two resin coatings and form a multi-layer structured primer layer having a high peel strength, it is important that a solution or dispersion of the modified olefin resin be coated on an uncured coating of the base resin. For example, when a coating of the modified olefin resin is formed on a baked coating of the base resin, a polyolefin-metal bonded structure having a high bonding strength cannot be obtained at all. The reason is believed to be that peeling is readily caused between the base resin layer and the modified olefin resin layer. When this latter coating method is adopted, it is important that sufficient mingling of both the resins takes place at the interface between the base resin layer and the modified olefin resin layer or in areas adjacent to the interface. In this coating method, other conditions such as amounts coated of the respective resins, coating means and heat treatment means can be the same as in the first-mentioned method.

In the present invention, a so-called double-coat or multi-coat primer layer can be formed by coating one or more known primer coating compositions free from the modified olefin resin onto the metal substrate and then applying a liquid coating composition containing the modified olefin resin and base resin to such primer coating.

The fact that the primer layer formed according to the present invention has the above-mentioned multi-layer distribution structure can be confirmed by dividing the primer layer into three sub-layers, namely, a topmost sub-layer ($L_S$), an intermediate sub-layer ($L_M$) and a lowermost sub-layer ($L_B$), and determining the distribution ratios (contents, %) of the modified olefin resin in the respective sub-layers. More specifically, a heat-treated primer coating is caused to fall in contact with steel wool attached to a rotation shaft, thereby peeling off a layer having a predetermined thickness (about 1 micron) by abrasion. The iron component is removed from the powder of the peeled coating by using a magnet and the residual powder is subjected to infrared absorption analysis using the KBr pellet method. An absorption, e.g., the methylene stretching frequency (2920 $cm^{-1}$), which does not overlap the characteristic absorptions for the base resin, is chosen as the characteristic absorption for the modified olefin resin, and the concentration of the latter is determined from a calibration curve.

In the bonded structure of the present invention, the first coating layer is characterized in that the distribution ratio of the modified olefin resin in the topmost sub-layer ($L_S$) there is at least about 50%, and preferably at least about about 70%, and the distribution ratio in the lowermost sub-layer ($L_B$) is not higher than about 10%, and preferably not higher than about 5%.

Any conventional paints composition can be used to form the second coating layer so long as the resulting second coating layer has excellent adhesion or bonding to the second article and a peel strength of between about 0.05 and 5 kg/cm, and preferably between about 0.4 and 1.5 kg/cm, is attained between the second coating layer and the sub-layer of the first coating layer contiguous thereto.

Among resins already mentioned with respect to the first coating layer, a suitable resin is chosen as the coating film forming base resin appropriately depending on the kind of the second article to be bonded thereto.

Not only the above-mentioned metal substrates but also various films, sheets, packings and other molded articles composed of plastics and rubbers, papers and composite products thereof can be used as the second article.

Materials suitable for use as the second article include polyolefins such as low-density polyethylene, medium density polyethylene, high-density polyethylene, polypropylene, polybutene-1, poly-4-ethylpentene-1, -ethylene-propylene copolymers, ethylene-vinyl acetate copolymers and ionomers; polyamides such as nylon 6, nylon 6,6, nylon 6,10 and nylon 12; polyesters such as polyethylene terephthalate and polybutylene terephthalate; polycarbonates; acrylonitrile copolymers such as highnitril resins; other acrylic resins; and chlorine-containing resins such as polyvinyl chloride, polyvinylidene, vinyl chloride-vinyl acetate copolymers and chlorinated polyethylene. Films composed of these plastic materials can be undrawn or biaxially stretched, synthetic rubbers, including, for example, styrene-butadiene rubbers, nitrile rubbers, ethylene-propylene rubbers, ethylene-propylene-diene rubbers, butyl rubbers, stereo-regular rubbers and polyisobutylene rubbers. Further, a blend of at least one of the above-mentioned plastic materials and at least one of the above-mentioned rubbers can be used. These materials can be applied to the present invention in the form of a molded article such as a packing. Further, these plastic materials can be subjected to the corona discharge treatment, ozone treatment or other surface treatment so as to improve their adhesion to the coating.

Moreover, these materials may be used as the second article in the form of a composite article. For example, a laminate comprising a metal foil such as an aluminum foil, a polyolefin film formed as the heat seal layer on one surface of the metal foil and a protective layer of a high-melting-point film or paper formed on the other surface of the metal foil can be used as the second article.

In the case where the second article is composed of a polyolefin having normally poor bondability, a paint having the same composition as described hereinbefore with respect to the first coating can be used for formation of the second coating layer to form a coating layer having a multi-layer distribution structure in which the base resin is distributed predominantly in the portion contiguous to the first coating layer and the modified olefin resin is distributed predominantly in the portion contiguous to the second article-contributing polyolefin. In this case, a peelable bond can be formed at the interface between the first coating layer and the second coating layer while attaining tight fusion bonding between the olefin resin and the second coating layer.

The second layer coating can be formed in an amount of 500 mg/dm$^2$, preferably 10 to 100 mg/dm$^2$, as the base resin.

Bonded structures according to the present invention are especially useful in the form of an olefin resin layer fusion-bonded to a paint-coated metal substrate. in this embodiment, the polyolefin layer is heat-bonded to the metal substrate through a double coating of the aforementioned primer layer at a temperature at least about 10° C. greater than the higher of the melting point of the modified olefin resin and the melting point of the polyolefin, generally at about 120° to 300° C., and preferably at about 150° to 230° C. The polyolefin is applied in the form of a film, sheet, powder or other molded article to the primer layer formed on the metal substrate, and the polyolefin is heated at the above-mentioned temperature to fusion-bond the polyolefin to the second coating layer. The assembly is then cooled to obtain a bonded structure. Heating of the polyolefin can be accomplished by various means, for example, (a) passing the assembly through a heated furnace, (b) heating the assembly by the heat transferred from a heated press or roll, (c) heating the metal substrate in advance or in situ by high frequency induction heating or the like and fusion-bonding the polyolefin to the metal substrate, and (d) heating the assembly by infrared rays, ultrasonic vibration, plasma or laser.

Another method for bonding a polyolefin layer as the second article to the metal substrate through the primer layer according to the present invention comprises extruding a polyolefin melt at the above-mentioned temperature onto the composite coating layer formed on the metal substrate to fusion-bond the polyolefin to the metal substrate through the composite coating. In this method, the molten polyolefin can be applied in the form of a continuous molded article such as a tape, film, sheet, tube or sheath onto the coated metal substrate using extrusion coating techniques. Another suitable method involves extruding the polyolefin in molten form and then fusion-bonding it to the metal substrate while the molten polyolefin is cooled and molded into a desirable shape by a roll, press or stamper. The former extrusion coating method is advantageous when a continuous coating of the polyolefin onto the metal substrate is desired, and the latter method is advantageous when a layer of the polyolefin is to be formed on a specific portion of the metal substrate. Fusion bonding of the polyolefin to the metal substrate can be completed in a very short time, e.g., on the order of a microsecond or millisecond, if desired.

When the polyolefin applied to the composite coating layer on the metal substrate is to be cross-linked, foamed, or cross-liked and foamed, after fusion-bonding of the polyolefin to the primer layer on the metal substrate the polyolefin layer is heated at a temperature higher than the decomposition temperature of the foaming agent or cross-linking agent, as the case may be.

For example, when it is desired to form a coating of an olefin resin having excellent heat resistance, durability and mechanical properties such as elasticity on the metal substrate, it is desirable to incorporate a cross-linking agent in the olefin resin. When it is desired to form a coating having good cushioning properties necessary for a packing or sealant, it is preferred to incorporate a foaming agent, optionally with a cross-linking agent, into the olefin resin.

Suitable cross-linking and foaming agents, include, for example, cross-linking agents decomposing at temperatures approximating the processing temperature (softening paint) of the resin used, such as organic peroxides, e.g., dicumyl peroxide, di-t-butyl peroxide, cumyl hydroperoxide and 2,5-dimethyl-2,5-di(t-butyl-peroxy) hexene-3, and foaming agents decomposing at temperatures near the processing temperature of the resin used, such as 2,2'-azobisisobutyronitrile, azodicarbonamides and 4,4-hydroxybenzenesulfonylhydrazide. The cross-linking agent is used in an amount of between about 0.1 and 5% by weight based on the resin and the foaming agent is used in an amount of between about 0.2 and 10% by weight based on the resin.

Various additives can be incorporated into the polyolefin according to procedures known in the art. For example, there may be incorporated antioxidants or stabilizers of the phenol type, organic sulfur type, organic nitrogen type or organic phosphorus type, lubricants such as metal soaps or other fatty acid derivatives, fillers such as calcium carbonate, white carbon, titanium white, magnesium carbonate, mangesium carbonate, magnesium silicate, carbon black and clays, and coloring agents.

When a second article composed of a performed metal foil or sheet or plastic film or sheet is bonded through the second coating layer, the second article is applied to the second coating layer while the base resin is still in the uncured or semi-cured state. The assembly is heated according to need and the second coating layer is cured to complete the bonding. In this case, the heating and curing conditions for the second coating layer are changed appropriately depending on the king of thermosetting base resin or curing agent contained in the second coating layer and the kind of second article to be bonded, but in general, the curing is carried out at about 10° to 250° C. preferably about 80° to 200° C., for 5 to 60 minutes, preferably about 15 to 30 minutes.

The first coating layer or the first and second coating layers can be applied to a molded article. Further, they can be applied to a metal substrate prior to forming it into a vessel lid or vessel. When the latter method is used, the difficult operation of coating separate articles and rusting of the metal substrate can be prevented, and such method is therefore advantageous from the viewpoint of production efficiency.

Both the first and second coating layers of the bonded structure of the present invention have excellent processability, and even when the bonded structure is subjected to treatments such as punching, press forming, bending, draw forming, crimping and ironing, the coatings are not damaged at all or breakage of the bonding is not caused.

As will be apparent from the foregoing, the present invention is highly useful for producion crown closures, bottle caps, can lids and other vessel closures including "easy open" vessel closures, which have a packing or sealant derived from a polyolefin. Further, by virtue of the aforementioned desirable combination of high peel resistance and high corrosion resistance, the bonded structure of the present invention is eminently useful for producing various lined vessels such as cans, tanks, chemical reaction vessels and flexible packages, construction materials and vehicle construction materials such as wall plates and roofing materials, and various ordinary utensils such as laminated tables, decorating materials, insulating materials, coated wires, coated cables and the like.

DESCRIPTION OF THE PREFERRED EMBODIMENTS

Figure 1:
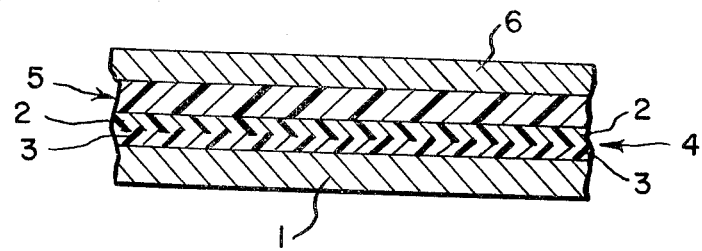
FIG. 1 is a sectional view illustrating diagrammatically one embodiment of the bonded structure of the present invention.

Referring to FIG. 1 illustrating diagrammatically a cross-section of the bonded structure of the present invention, a first coating layer 4 containing a modified olefin resin 2 and a coating film forming base resin 3 is applied to the surface to be bonded of a first article 1 composed of, for example, a metal substrate, and a second coating layer 5 is applied to the first coating layer 4. A second article 6 composed, e.g., of a metal or plastic material is bonded through the composite coating including the first coating layer 4 and the second coating layer 5. Any resin having good adhesion to metal substrate 1 can be used as the coating film-forming base resin 3 in the first coating, and any resin having good adhesion or bondability to second article 6 can be used for second coating layer 5. The primer layer 4 has a multi-layer distribution structure with concentration gradients in the thickness direction such that the modified olefin resin 2 is distributed predominantly in the portion of layer 4 contiguous to the interface with layer 5 and the base resin 3 is distributed predominantly in the opposite side portion, namely the portion contiguous to metal substrate 1.

By forming the multi-layer distribution structure in the first layer 4 as shown in FIG. 1, the peel strength between the first coating layer 4 and the second coating layer 5 is between about 0.05 and 5 kg/cm. In such circumstances peeling does not occur with normal handling or under certain shocks but peeling can be accomplished manually with ease when desired. Furthermore, by forming the above-mentioned multi-layer distribution structure in first coating layer 4, the adhesion of that layer to metal substrate 1 can be remarkably improved compared to when the modified olefin resin and the base resin are homogenously distributed within the sub-layers. Furthermore, by virtue of this feature, the mechanical strength of the coating layer per se can be improved and the corrosion resistance and processability of the coated metal substrate are enhanced.

Figure 2:
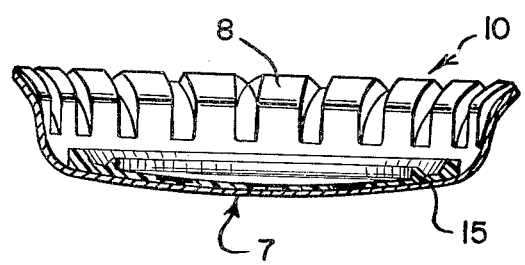
FIG. 2 is a sectional side view illustrating another embodiment of the present invention in the form of a crown closure for use in premium sales.
Figure 3:
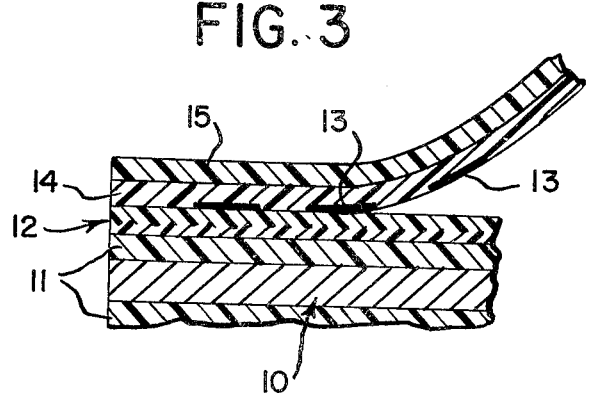
FIG. 3 is an enlarged partial sectional view of one embodiment of the invention illustrating the structure of a crown or cap closure for use in premium sales.

Referring to FIG. 2 illustrating a bonded structure of the present invention in the form of a crown closure for use in premium sales, crown shell 10 includes a smooth top plate portion 7, crimped skirt section 8, and packing 15 applied to the interior of the shell. Referring to FIG. 3, which is a partially enlarged sectional view illustrating the crown closure of FIG. 2, a layer 11 of a conventional protecting paint is formed on each of the surfaces of crown closure 10 which is composed of a metal such as aluminum, tin-plated steel or tin-free steel (electrolytically treated steel). A first coating layer 12 composed of a modified olefin resin and a base resin and having a multi-layer distribution structure is applied to the inner face of the crown sheet 10 and a printing ink layer 13 having a hit mark or the like is formed on the first coating layer 12. A second coating layer 14 composed of a coating film-forming base resin is applied to the first coating layer 12 and printing ink layer 13. A packing 15 of synthetic resin or synthetic rubber is formed on the second coating layer 14 by daubing the resin or rubber in the molten or semi-molten state into the crown shell and pressing it under cooling by an appropriate stamping member (not shown). Alternatively, a packing 15, molded in advance in the form of a disc, can be inserted into the crown or cap and bonded to the second coating layer 14 by induction heating or the like.

In the crown shell of FIGS. 2 and 3, the first coating layer 12 is tightly bonded to shell 10 through an optional undercoat protecting layer 11 at a peel strength of at least 2 kg/cm, and the second coating layer 14 is bonded to packing 15 at a peel strength of at least 2.0 kg/cm. Thus, the peel strength between the metal substrate and first coating layer is higher than the peel strength between the first coating layer 12 and the second coating layer 14. Further, printing ink layer 13 is bonded to second coating layer 14 at a peel strength higher than the peel strength of the ink layer to the first coating layer 12. Accordingly, the packing 15 can be easily separated together with the printing ink layer 14 from the crown shell 10 between the first coating layer 12 and the second coating layer 14.

When the packing 15 is composed of a vinyl chloride resin, the second coating layer 14 can be formed of, for example, a vinyl chloride-vinyl acetate copolymer or acrylic resin optionally modified with a phenolic resin or epoxy resin. When the packing 15 is formed of a polyolefin resin, the second coating layer 14 can be a coating layer of a multi-layer distribution structure formed of a modified olefin resin and a coating film forming base resin as in the case of the first coating layer 12.

Figure 4:
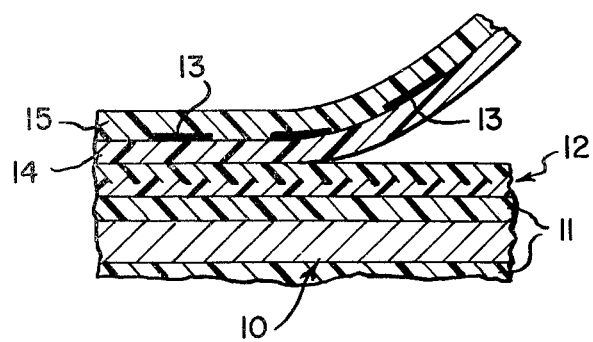
FIG. 4 is an enlarged partial sectional view of another embodiment of the invention illustrating the structure of a crown or cap closure for use in premium sales.

Referring to FIG. 4, printing ink layer 13 can be formed on the second coating layer 14 and located between the second coating layer and packing 15 so that the printing ink layer can be separated together with the packing 15 from the crown or cap shell 10.

Figure 5:
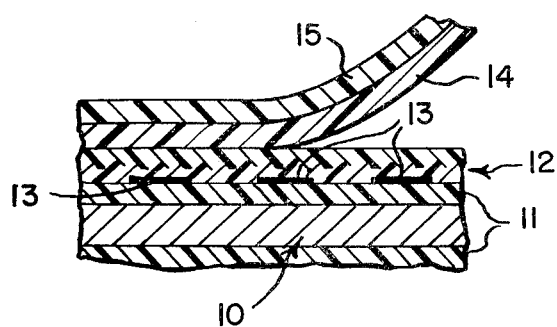
FIG. 5 is an enlarged partial sectional view of still another embodiment of the invention illustrating the structure of a crown or cap closure for use in premium sales.

Referring to FIG. 5, printing ink layer 13 can be formed on the protecting paint layer 11 of the crown shell 10 so that the ink layer is left on the side of the shell when the packing 15 is separated from the shell.

Figure 6:
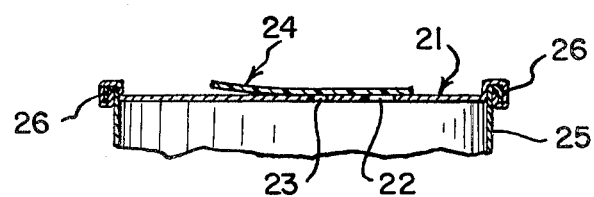
FIG. 6 is a sectional view illustrating still another embodiment of the invention illustrating structure of a crown or cap closure for use in premium sales.
Figure 7:
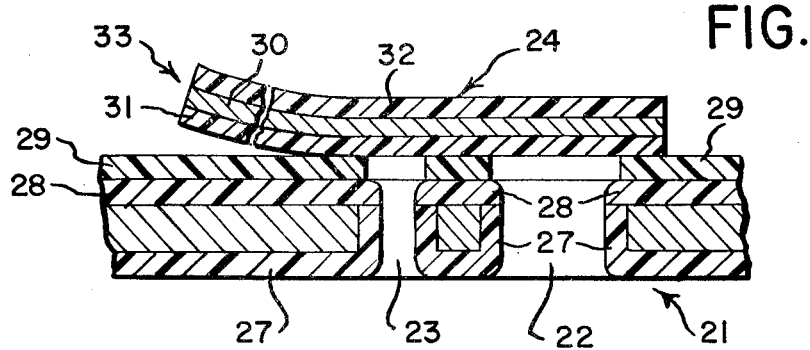
FIG. 7 is an enlarged partial sectional view illustrating the bonded structure shown in FIG. 6.

Referring to FIGS. 6 and 7 illustrating a bonded structure provided with an easy-open mechanism, beverage can lid 21 composed of a metal substrate such as aluminum, tin plated steel or tin-free steel is provided with an opening 22 for drinking the beverage and an opening 23 for admitting air into the can, and a peel piece 24 is attached to cover these openings. A double seam 26 is formed on the periphery of the can between the can lid 21 and a can body 25. A layer 27 of a known protecting paint is formed on the inner face of the can lid 21, and covers the lid entirely, even at the openings 22 and 23 so that the metal substrate is not directly exposed to the atmosphere or contents of the vessel.

A first coating layer 28 containing a modified olefin resin and a base resin and a second coating layer 29 having a composition and multi-layer distribution structure similar to that of the first coating layer 28 are applied to the outer face of can closure 21, and in each of these coating layers 28 and 29, the modified olefin resin is distributed predominantly in the top face portion.

The peel piece 24, the second article of the bonded structure is a laminate comprising foil 30 of a metal such as aluminum, heat seal layer 31 of a polyolefin formed on one surface of the metal foil and layer 32 of a heat-resistant resin such as polyethylene terephthalate formed on the other surface of the metal foil 30. This peel piece 24 has a holding portion 33 on one end thereof, and the heat seal layer 31 of the peel piece is heat-sealed to the can lid so that the layer confronts the outer face of the can lid and covers completely the openings 22 and 23 of the can lid.

By holding portion 33 of the peel piece 24 and pulling it outwardly, peeling is readily effected between the first coating layer 28 and second coating layer 29 and the can is thereby easily opened.

Figure 8:
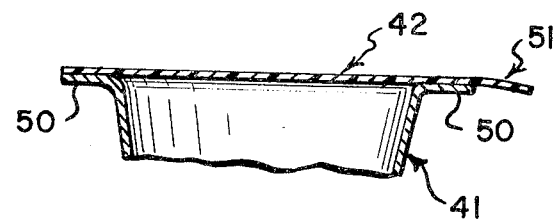
FIG. 8 is an partial sectional view illustrating still another embodiment of the present invention in the form of a sealed metal vessel.
Figure 9:
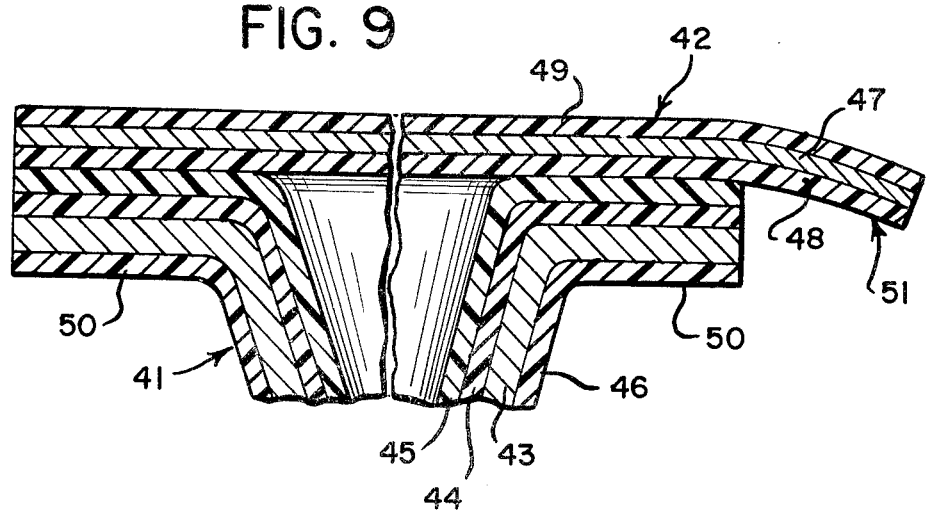
FIG. 9 is an enlarged partial sectional view illustrating the bonded structure shown in FIG. 8.

FIGS. 8 and 9 illustrate a sealed metal vessel as the bonded structure of the invention. The first article is a draw-formed or draw-iron-formed vessel 41, and the second article is a lid member 42. A first coating layer 44 and a second coating layer 45 are formed on the inner face of metal substrate 43 of vessel 41, and a surface protecting layer 46 is formed on the outer face of the vessel. The second article 42 is a lid member composed of a laminate comprising metal foil 47, a heat-sealable layer 48 formed on one surface of the metal foil and a heat resistant layer 49 formed on the other surface of the foil. A flange 50 is formed in the peripheral portion of vessel 41, and the lid member 42 is bonded to the flange by heat sealing. When the vessel is to be opened, a holding portion 51 of lid member 42 is held and pulled upwardly, whereby peeling is caused between the first coating layer 44 and the second coating layer 45.

Figure 10:
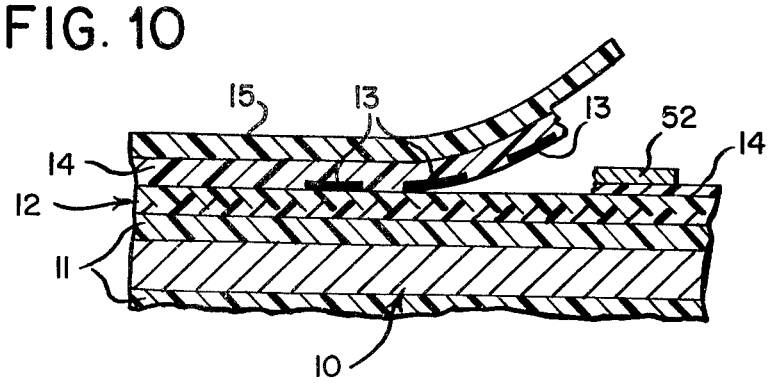
FIG. 10 is an enlarged partial sectional view showing a specification of the crown or cap of FIG. 3.

Conventional means can optionally be adopted to facilitate the peeling of the bonded article. For example, in the embodiment shown in FIG. 10, peeling is initiated between coating layer 14 and packing 15 instead of initiating peeling at the interface between the two coating layers 12 and 14. The coating layer 14 is then broken and peeling is advanced between coating layers 12 and 14. For this purpose, a non-adhesive masking layer 52 can be formed at the peeling-initiating portion between coating layer 14 and packing 15.

The following examples are presented for the purpose of illustrating without limitation the features of the present invention and the advantages thereof. In the examples, parts and percentages are by weight unless otherwise indicated.

EXAMPLE 1

A mixture of 1.0 mole of p-cresol, 1.2 moles of formaldehyde and 0.2 mole of ammonia is heated on a water bath to effect reaction to form an ammonia-cresol base resin. A quantity (40 parts) of this resin and 60 parts of a bisphenol-A type epoxy resin (Epikote $^R$ 1007 manufactured by Shell Chemical Company) are dissolved in a mixed organic solvent made up of equal amounts of methylisobutyl ketone and methylethyl ketone to form a base resin solution. Next, a modified olefin resin (modified polyethylene) indicated in Table 1 is dissolved in hot xylene to form a 10% solution. This solution is added to the base resin solution with sufficient agitation so that the amount of modified olefin resin added to the base resin is as indicated in Table 1. In this way, a primer coating composition or paint having a total solids content of about 30% is obtained.

The primer coating composition is roll-coated on a surface-treated steel plate having a thickness of 0.2 mm (Hi-Top ® manufactured by Toyo Seikan) in an amount such that the thickness after curing and drying is 6 microns, and the applied composition is heated at 200° C. for 10 minutes to form a first coating layer.

The primer layer is divided into three thin sub-layers each having a thickness of about 2 microns (topmost sub-layer, $L_S$, intermediate sub-layer, $L_M$ and lowermost sub-layer, $L_B$) according to the afore-mentioned surface polishing method. The amount of modified polyolefin in each sub-layer is determined by infrared absorption and the distribution ratio (%) is calculated therefrom. The results obtained are shown in Table 1.

A primer composition E-3 shown in Table 1 is roll-coated as the second coating layer onto the first coating layer to a thickness (after curing and drying) of 5 microns, and the coating is heated at 200° C. for 10 minutes to form a coated steel plate having a metal substrate/first coating layer/second coating layer bonded structure.

A sheet composed of low density polyethylene (having a melt index of 2 and a density of 0.920) and having a thickness of about 0.5 mm is heat-bonded to the coated steel plate under a pressure of 5 kg/cm$^2$ at 180° C. for 3 minutes by using a hot press, and the assembly is quickly cooled to form a metal substrate/first coating layer/second coating layer/polyethylene bonded structure. The peel strength between the polyethylene and the metal substrate is determined at a peeling speed of 50 mm/min, a temperature of 20° C., and a peeling angle of 180° by using an Instrom type universal tensile tester to obtain the results shown in Table 1.

first coating layer at a satisfactory peel strength and a peelably bonded structure is obtained.

When the density or degree of modification exceeds a certain range in the modified polyolefin as in comparison 3, the feature whereby the modified polyolefin is distributed predominantly in the surface portion of the first coating layer is lost, and the desired peelability in the interface between the first and second coating layers cannot be obtained.

When the amount of modified polyolefin contained in the first coating layer is too large as in comparison 4, no smooth lustrous coating can be obtained and a coated plate having satisfactory properties cannot be prepared.

EXAMPLE 2

As the base resin solutions, the following three mixtures are prepared: (1) a 30% solution of epoxyphenolic composition (80 parts of Epikote 1007 manufactured by Shell Chemical Company and Hitanol 2080 manufactured by Hitachi Kasei) in a mixed solvent made up of equal amounts of xylene and butylcellosolve, (2) a 30% solution of an epoxy-amino composition (80 parts of

TABLE 1

| Sample No.* | Polyolefin Degree (%) of Crystallization | Polyolefin Degree (meq/100g) of Modification | Amount (%) by Weight | Polyolefin Distribution (%) Sub-layer $L_S$ | Sub-layer $L_M$ | Sub-layer $L_B$ | Peeling Test Results Peel Strength | Peeled Interface** |
|---|---|---|---|---|---|---|---|---|
| Comparison 1 | | | 0 | 0 | 0 | 0 | 2.74 ~ 3.15 | PE - Second |
| Comparison 2 | 33.1 | 0 | 20 | 98.6 | 1.0 | 0.5 | 0 | Second - First |
| E-1 | 32.0 | 0.01 | 20 | 94.0 | 5.8 | 0.2 | 0.04 ~ 0.06 | Second - First |
| E-2 | 87.1 | 0.58 | 20 | 91.2 | 8.0 | 0.8 | 0.50 ~ 0.65 | Second - First |
| E-3 | 74.4 | 30.5 | 20 | 86.5 | 12.1 | 1.4 | 0.21 ~ 0.36 | Second - First |
| E-4 | 69.2 | 72.2 | 20 | 80.1 | 14.7 | 5.2 | 0.27 ~ 0.44 | Second - First |
| E-5 | 80.7 | 206 | 20 | 37.5 | 32.7 | 9.8 | 1.36 ~ 1.58 | Second - First |
| E-6 | 45.9 | 253 | 20 | 37.4 | 34.5 | 25.1 | 0.28 ~ 0.29 | First - M |
| E-7 | 87.1 | 0.58 | 1.0 | 99.3 | 0.6 | 0.1 | 1.73 ~ 1.96 | Second - First |
| E-8 | 87.1 | 0.58 | 5.9 | 95.6 | 4.2 | 0.3 | 0.73 ~ 1.54 | Second - First |
| E-9 | 87.1 | 0.58 | 60 | 75.5 | 21.0 | 3.5 | 0.20 ~ 0.49 | Second - First |
| E-10 (comparison 4) | 87.1 | 0.58 | 60 | | | | 0.37 ~ 0.45 | First - M |
| E-11 | 55.3 | 10.2 | 20 | 59.2 | 33.5 | 7.4 | 0.58 ~ 0.71 | Second - First |
| P-1 | 60.9 | 50.5 | 20 | 79.7 | 14.8 | 6.0 | 0.32 ~ 0.45 | Second - First |

Note:
*Comparison 1: sample free of a modified polyolefin
Comparison 2: sample in which unmodified high density polyethylene is added
E: sample in which maleic anhydride-modified polyethylene is added
P: sample in which maleic anhydride-modified polypropylene is added
**PE: polyethylene face
Second: second coating layer
First: first coating layer
M: metal face For example, First-Second means that peeling is caused in the interface between the first coating layer and the second coating layer.

From the results shown in Table 1, it can be seen that when the first coating layer is free from a polyolefin as in comparison 1, since the first coating layer is tightly bonded to the first coating layer, a bonded structure having easy-peeling characteristics cannot be obtained. Also, when the first coating layer contains an unmodified polyolefin as in comparison 2 no smooth coating is formed and no coated plate having satisfactory properties can be obtained.

In contrast, when the first coating layer has a modified polyolefin effectively distributed in the surface portion, the second coating layer can be bonded to the Epikote 1004 and 20 parts of Melan 11 manufactured by Hitachi Kase) in a mixed solvent made up of equal amounts of xylene and butylcellosolve, and (3) a 30% solution of a vinyl-phenolic-epoxy composition (70 parts of Slec C manufactured by Sekisui Kagaku, 20 parts of Hitanol 2080 and 10 parts of Epikote 834) in a mixed solvent made up of equal amounts of methylethyl ketone and butycellosolve.

A maleic acid-modified polyethylene (having a degree of crystallinity of 87.1% and a degree of modification of 0.58 milliequivalent per 100 g of the polymer) is added to each base resin solution in an amount of 10% based on the solids in the base resin solution to form a primer coating composition having a total solids content of about 30%.

The above-mentioned three primer coating compositions are coated on surface-degreased tinplates having a thickness of 0.25 mm by means of a coating roll so that the thickness after curing and drying is 5 microns. Each coating is heated at 190° C. for 10 minutes to form a first coating.

The above-mentioned three base resin solutions free from the modified polyolefin are independently coated on the first coating layers so that the thickness after curing and drying is 5 microns. An aluminum foil having a thickness of 0.05 mm is applied to the coated surface and the assembly is heated at 190° C. for 15 minutes to form an aluminum foil/second coating/first coating/tinplate bonded structure. In each of the three prepared bonded structures, the peel strength (kg/cm) between the aluminum foil and tinplate is determined and results obtained as shown in Table 2.

In the bonded structure formed by using the modified polyethylene-free resin solution for formation of the first coating layer, the aluminum foil cannot be separated from the tinplate because of excessive bonding between the first and second coating layers. In contrast, in the bonded structure formed by using the modified polyethylene-containing primer composition for the formation of the first coating layer according to the present invention, the aluminum foil can easily be peeled from the tinplate. In each of the samples of the present invention, peeling occurs at the interface between the first and second coating layer.

In each of the samples made according to the present invention, peeling is caused in the interface between the first and second coating layers.

EXAMPLE 4

Primer coating compositions E-1 to E-11 and P-1 shown in Table 1 are independently roll-coated on surface-treated steel plates having a thickness of 0.3 mm so that the thickness after curing and drying is 5 microns and the coatings are heated at 200° C. for 10 minutes to form first coating layers. Each first coating layer is printed by a metal printing ink comprising a resin-modified alkyd resin (vehicle), Phthalocyanine Blue (pigment), manganese chloride (drier) and kerosine (solvent) and heated at 150° C. for 10 minutes to form printed letters of the first coating layer.

A primer coating composition (having a total solids content of 30%) comprising 70 parts of an epoxy resin (Epikote 1007), 20 parts of a phenolic resin (Hitanol 2080) and 15 parts of a maleic acid-modified polyethylene (having a degree of crystallinity of 87.1% and a degree of modification of 0.58 meq/100 g of the polymer) in an organic solvent (mixed solvent of equal amounts of xylene and butylcellosolve) is roll-coated on the first coating layer and printed letters so that the thickness after curing and drying is 6 microns, and the assembly is heated at 200° C. for 10 minutes to form a printed coated plate.

The printed coated plate is formed into crown shells

TABLE 2

| First Coating Layer | Second Coating Layer | | |
|---|---|---|---|
| | epoxy-phenolic | epoxy-amino | vinyl-phenolic-epoxy |
| epoxy-phenolic-modified polyethllene | 0.29 ~ 0.35 | 0.23 ~ 0.28 | 0.20 ~ 0.25 |
| epoxy-amino-modified polyethylene | 0.38 ~ 0.49 | 0.25 ~ 0.31 | 0.18 ~ 0.26 |
| vinyl-phenolic-epoxy-modified polyethylene | 0.26 ~ 0.34 | 0.16 ~ 0.22 | 0.08 ~ 0.14 |
| epoxy-phenolic | not-peeled* | not-peeled | not-peeled |
| epoxy-amino | not-peeled* | not-peeled | not-peeled |
| vinyl-phenolic-epoxy | not-peeled* | not-peeled | not-peeled |

EXAMPLE 3

In the same manner as in Example 2, a first coating layer is formed on a tinplate. Then, a vinyl-phenolic paint (a 20% solution of 80 parts of Slec C and 20 parts of Hitanol in methylisobutyl ketone) is coated on the first coating layer so that the thickness after curing and drying is 5 microns and heated at 190° C. for 10 minutes to form a second coating layer.

Next, a vinyl chloride resin compound (comprising 60 parts of polyvinyl chloride, 40 parts of dioctyl phthalate and 0.7 part of azodicarbonamide) is coated on the second coating layer to a thickness of 1 mm and heated at 200° C. for 1 minute to effect gelation and foaming and form a foamed vinyl chloride resin/second coating layer/first coating layer/tinplate bonded structure. The peelability of the foamed vinyl chloride resin from the tinplate is examined and it is found that, in the case of the bonded structure formed by using a modified polyethylene-free base resin for formation of the first coating layer, the foamed vinyl chloride resin cannot be separated from the tinplate because of excessive bonding force between the first and second coating layers. In contrast, when a modified polyethylene-containing primer is used according to the present invention, the foamed vinyl chloride resin can easily be peeled from the tinplate.

so that the printed surface is located inside. Molten low density polyethylene (having a melt index of 7 and a density of 0.923) is flowed into the crown shells in an amount of about 0.2 g per crown, and cooled and punched by a press punch to form crown closures having a polyethylene liner. The peelability of the polyethylene liner from the crown shell and the processability (adaptability to blanking and bending) and outdoor corrosion resistance are determined, and the results are shown in Table 3.

TABLE 3

| | Peeling Property | | | |
|---|---|---|---|---|
| Sample No. | Ease of Peeling | Peeled Interface | Processability | Corrosion Resistance |
| E-1 | O | 2-1 first - second | O | O |
| E-2 | O | first - second | O | O |
| E-3 | O | first - second | O | O |
| E-4 | O | first - second | O | O |
| E-5 | O | first - second | Δ | O |
| E-6 (comparison 6) | O | first - M | X | X |
| E-7 | O | first - second | O | O |
| E-8 | O | first - second | O | O |
| E-9 | O | first - second | O | O |
| E-10 (comparison 4) | O | First - M | X | X |
| E-11 | O | first - second O | | |

TABLE 3-continued

| Sample No. | Peeling Property | | Process-ability | Corrosion Resistance |
| --- | --- | --- | --- | --- |
| | Ease of Peeling | Peeled Interface | | |
| P-1 | O | first - second | O | O |

Crown closures prepared by using the modified polyolefin-containing primer coating composition according to the present invention for formation of the first coating layer have bonding properties such that the liner does not separate during the tumbling test, but can be easily be peeled when pulled. The second coating layer and printed layers are transferred onto the peeled polyethylene liners.

However, when the density or degree of modification of the modified polyolefin exceeds a certain range as in comparison 3, since the modified polyethylene is not distributed predominantly in the surface portion of the first coating layer, no peeling can be attained between the first and second coating layers and the properties of the resulting crown closures are degraded. When the amount of modified polyethylene contained in the first coating layer is too large, no smooth lustrous coating layer is formed and the properties of the resulting crown closures are degraded.

EXAMPLE 5

In the same manner as in Example 4, a first coating layer is formed on a surface-treated steel plate, and the same primer coating composition as used in Example 4 for formation of the second coating layer is roll-coated on the first coating layer so that the thickness after curing (at 200° C. for 10 minutes) and drying is 6 microns.

Letters are printed on the second coating layer by using the same metal printing ink as in Example 4, and heating is conducted at 150° C. for 10 minutes to prepare a printed coated plate.

The printed coated plate is formed into crown shells so that the printed surface is located inside. In the same manner as in Example 4, crown closures having a polyethylene liner are prepared.

Crown closures prepared by using the modified polyolefin-containing primer coating composition according to the present invention for formation of the first coating layer have bonding properties such that the liner does not separate in the tumbling test, but can be readily peeled when pulled. The second coating layer and printed letters were transferred onto the peeled polyethylene liners.

EXAMPLE 6

A rust-preventing undercoat lacquer paint comprising 70 parts of a vinyl chloride-vinyl acetate copolymer, 25 parts of a bisphenol-A type epoxy resin having a molecular weight of about 370 and 5 parts of an amino resin (butylated urea resin) in an organic solvent is roll-coated on a material for electro-plating of tin so that the thickness after curing and drying is 3 microns, and the coating is heated at 190° C. for 10 minutes. Primer coating compositions E-1 to E-11 and P-1 shown in Table 1 are independently roll-coated on the thus-formed rust-preventing coating layer so that the thickness of the resulting first coating layer after curing (at 200° C. for 10 minutes and drying is 5 microns.

Letters are printed on the thus-formed first coating layer by using the same metal print ink as used in Example 4, and heating is conducted at 150° C. for 10 minutes.

A primer coating composition having a total solids content of 30% and comprising 70 parts of an epoxy resin (Epikote 1007), 10 parts of a urea resin (butylated urea resin) and 20 parts of oxidized polyethylene (having a density of 1.0, a softening point of 135° C. and a total oxygen content of 4.3%) in an organic solvent (mixture of equal volumetric amounts of xylene and butylcellosolve) is roll-coated on the first coating layer and printed letters so that the thickness after curing and drying is 5 microns, and the second coating layer is heated at 200° C. for 10 minutes to form a printed coated plate.

The printed coated plate was formed into crown shells so that the printed face was located inside. In the same manner as described in Example 4, crown closures having a polyethylene liner are prepared.

Crown closures prepared by using the modified polyolefin-containing primer coating composition according to the present invention for formation of the first coating layer have bonding properties such that the liner does not become separated in the tumbling test, but which nevertheless can easily be peeled when pulled. The second coating layer and printed letters are transferred onto the peeled polyethylene liners.

EXAMPLE 7

Oxidized polyethylene (having a density of 1.0, a softening point of 135° C. and a total oxygen concentration of 4.3%) is added to the base resin solution used in Example 1 in an amount of 20% based on the solids in the base resin solution, to form a primer coating composition having a total solids content of about 30%.

The primer coating composition is roll-coated on a surface-treated steel plate having a thickness of 0.2 mm (Hi-Top manufactured by Toyo Kohan) so that the thickness after curing and drying is 6 microns and heating is conducted at 200° C. for 10 minutes to form a first coating layer. In the same manner as in Example 3, a second coating layer is formed on the first coating layer and a gelled foamed layer is further formed by coating and heating of the vinyl chloride resin compound, to form a foamed vinyl chloride resin/second coating layer/first coating layer/metal substrate bonded structure. The peelability of the formed vinyl chloride resin from the metal substrate is tested and it is found that the foamed vinyl chloride resin can easily be peeled from the metal substrate and that the peeling occurs at the interface between the first and second coating layers.

The disclosure herein establishes the advantages of the present invention in preparing bonded structures having predetermined peel strengths. It will be understood, of course, that changes and variations can be made in the foregoing without departing from the scope of the present invention which is defined in the following claims.

We claim:

1. A peelable bonded structure comprising a plurality of articles including at least one metal article bonded together through a composite coating layer, said composite coating layer comprising adjacent first and second coating layers, at least the first coating layer comprising:

(a) an olefin resin (A) modified with a copolymerized carbonyl group-containing ethylenically unsaturated monomer whereby said modified olefin resin contains carbonyl groups at a concentration of between about 0.01 and 200 milliequivalents per 100 g of the modified olefin resin and having a degree of crystallization at least about 50%; and (b) a coating film-forming base resin (B) at an (A)/(B) weight ratio of between about 0.2/99.8 and 40/60, and having a density greater by about 0.1 than the density of the modified olefin resin;

and said first coating layer having a multi-layer distribution structure with resin concentration gradients in the thickness direction such that the modified olefin resin is distributed predominantly in the portion contiguous to the interface between the first and second coating layers and the base resin is distributed predominantly in the opposite portion, and wherein said plurality of articles have a peel strength of between about 0.05 and 5/kg/cm between the first and second coating layers.

2. A bonded structure according to claim 1 wherein the first coating layer is divided into three sub-layers, the distribution rato, Dx, defined by the following formula:

$$D_x = 10000 W_X/(W)(C_A)$$

wherein W is the weight of the first coating layer per unit surface area (mg/dm$^2$), $C_A$ is the average % by weight of the modified olefin resin in the first coating layer, and $W_X$ is the weight per unit area (mg/dm$^2$) of the modified olefin resin in each sub-layer,
is at least about 50% in the sub-layer, $L_S$, contiguous to the second coating layer and not higher than about 10% in the sub-layer, $L_B$, contiguous to the metal substrate.

3. A bonded structure according to claim 1 wherein the modified olefin resin contains carbonyl groups at a concentration of between about 0.1 and 70 milliequivalents per 100 g of the olefin resin and has a degree of crystallinity at least about 70%.

4. A bonded structure according to claim 1 wherein the modified olefin resin is an olefin resin grafted with an ethylenically unsaturated carboxylic acid or ethylenically unsaturated carboxylic anhydride.

5. A bonded structure according to claim 1 wherein the base resin has a density between about 1.2 and 1.3 times greater than the density of the modified olefin resin and contains functional groups selected from hydroxyl functional groups and carbonyl functional groups at a concentration of at least 1 milliequivalent per gram of the base resin.

6. A bonded structure according to claim 1 wherein the base resin is selected from the group consisting of phenolic resin-epoxy resin paints, urea resin-epoxy resin paints, melamine resin-epoxy resin paints and phenolic resin-epoxy resin-vinyl resin paints.

7. A bonded structure according to claim 1 wherein the modified olefin resin is applied to the metal substrate in an amount coated of between about 0.1 and 10 mg/dm$^2$ and the base resin is applied to the metal substrate in an amount coated of between about 10 and 100 mg/dm$^2$.

8. A bonded structure according to claim 2 wherein the distribution ratio is at least about 70% in the sub-layer, $L_S$, and not higher than about 5% in the sub-layer, $L_B$.

9. A bonded structure according to claim 1 wherein a modified polyethylene-free undercoat layer composed of a resin selected from the group consisting of phenol-epoxy resins, epoxy-amino resins, vinyl-phenolic resins, epoxy-vinyl resins and phenol-epoxy-vinyl resins is formed in an amount of about 10 to 200 mg/dm$^2$ between the first coating layer and the metal substrate.

10. A bonded structure according to claim 1 wherein the second article is a polyolefin layer.

11. A bonded structure according to claim 1 wherein the second coating layer has the same composition and multi-layer distribution structure as the first coating layer.

12. A bonded structure according to claim 1 wherein said structure is a vessel closure.

13. A bonded structure according to claim 1 wherein the metal substrate is a crown shell or cap shell, the polyolefin layer is a packing material and the entire structure is a vessel closure.

* * * * *

UNITED STATES PATENT AND TRADEMARK OFFICE
CERTIFICATE OF CORRECTION

PATENT NO. : U.S. 4,269,321
DATED : May 26, 1981
INVENTOR(S) : ISAO ICHINOSE ET AL.

It is certified that error appears in the above—identified patent and that said Letters Patent is hereby corrected as shown below:

Column 5, line 28, "5-norborne" should read -- 5-norbornene --.

Column 13, line 9, "king" should read -- kind --.

Column 13, line 32, "producion" should read -- producing --.

Column 20, line 68, "first - second O     O" should read -- first - second     O        O --.

Signed and Sealed this

Eighteenth Day of August 1981

[SEAL]

Attest:

Attesting Officer

GERALD J. MOSSINGHOFF
Commissioner of Patents and Trademarks